United States Patent
Fischer et al.

(10) Patent No.: US 9,199,602 B1
(45) Date of Patent: Dec. 1, 2015

(54) PASSIVE AIR BAG WITH SLACK CREATOR

(71) Applicant: TRW Vehicle Safety Systems Inc., Washington, MI (US)

(72) Inventors: Kurt F. Fischer, Leonard, MI (US); Yohann Le Norcy, Valladolid (ES); Oscar Ugarte, Valladolid (ES); Daniel Sutherland, Richmond Township, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 0 days.

(21) Appl. No.: 14/338,538

(22) Filed: Jul. 23, 2014

(51) Int. Cl.
*B60R 21/239* (2006.01)
*B60R 21/2338* (2011.01)
*B60R 21/2342* (2011.01)
*B60R 21/16* (2006.01)

(52) U.S. Cl.
CPC ........... *B60R 21/239* (2013.01); *B60R 21/2338* (2013.01); *B60R 21/2342* (2013.01); *B60R 2021/161* (2013.01); *B60R 2021/2395* (2013.01); *B60R 2021/23382* (2013.01)

(58) Field of Classification Search
CPC .............. B60R 21/239; B60R 21/2342; B60R 21/2338; B60R 2021/161; B60R 2021/2395; B60R 2021/23382; B60R 2021/23384
USPC .............................................. 280/739, 743.2
See application file for complete search history.

(56) References Cited

U.S. PATENT DOCUMENTS

| | | | |
|---|---|---|---|
| 5,308,113 A * | 5/1994 | Moriset ....................... | 280/743.2 |
| 5,489,119 A * | 2/1996 | Prescaro et al. ........... | 280/743.2 |
| 6,773,030 B2 | 8/2004 | Fischer | |
| 6,832,778 B2 * | 12/2004 | Pinsenschaum et al. ..... | 280/739 |
| 6,981,719 B2 * | 1/2006 | Igawa ......................... | 280/743.2 |
| 7,093,854 B2 | 8/2006 | Fischer et al. | |
| 7,261,319 B2 | 8/2007 | DePottey et al. | |
| 7,328,915 B2 | 2/2008 | Smith et al. | |
| 7,347,450 B2 | 3/2008 | Williams et al. | |
| 7,448,646 B2 * | 11/2008 | Hall et al. ..................... | 280/739 |
| 7,597,356 B2 * | 10/2009 | Williams ...................... | 280/739 |
| 7,607,690 B2 * | 10/2009 | Abe et al. ..................... | 280/739 |
| 7,651,130 B2 * | 1/2010 | Bauberger ................. | 280/743.2 |

(Continued)

*Primary Examiner* — Laura Freedman
(74) *Attorney, Agent, or Firm* — Tarolli, Sundheim, Covell & Tummino LLP

(57) ABSTRACT

An apparatus for helping to protect an occupant of a vehicle includes an inflatable vehicle occupant protection device inflatable between a vehicle surface and the vehicle occupant. The protection device includes a front panel having a portion presented toward the occupant when the protection device is in an inflated condition. A vent includes at least one opening for releasing inflation fluid from the protection device and has an actuated condition and a non-actuated condition. A tether has a first end connected to the vent for actuating the vent and a second end connected to the protection device. A guide member connected to the front panel slidably receives a portion of the tether between the first and second ends. First and second portions of the guide member are releasably connected together to define a slackened portion. The first and second portions remain connected together in response to initial deployment of the protection device below a predetermined degree to prevent the tether from tensioning such that the vent is in the non-actuated condition. Further deployment of the protection device to the predetermined degree releases the connection between the first and second portions to allow the tether to tension and act on the vent to place the vent in the actuated condition based on the position of the occupant in the vehicle.

28 Claims, 12 Drawing Sheets

(56) References Cited

U.S. PATENT DOCUMENTS

| | | | |
|---|---|---|---|
| 7,784,828 B2 * | 8/2010 | Matsu et al. | 280/739 |
| 7,837,228 B2 * | 11/2010 | Abe | 280/743.1 |
| 7,883,110 B2 * | 2/2011 | Pausch | 280/739 |
| 7,922,197 B2 * | 4/2011 | Fukawatase et al. | 280/739 |
| 7,922,200 B2 * | 4/2011 | Webber | 280/743.2 |
| 7,931,297 B2 * | 4/2011 | Abe et al. | 280/739 |
| 7,931,299 B2 | 4/2011 | McFadden et al. | |
| 7,954,850 B2 | 6/2011 | Fischer et al. | |
| 7,992,897 B2 * | 8/2011 | Sekino et al. | 280/739 |
| 8,070,183 B2 * | 12/2011 | Kumagai et al. | 280/743.2 |
| 8,262,130 B2 * | 9/2012 | Fischer et al. | 280/743.2 |
| 8,419,058 B2 * | 4/2013 | Fischer et al. | 280/743.2 |
| 8,500,163 B2 * | 8/2013 | Mallinger et al. | 280/739 |
| 8,632,095 B2 * | 1/2014 | Fischer et al. | 280/743.2 |
| 8,646,808 B2 * | 2/2014 | Williams | 280/743.2 |
| 8,678,431 B2 * | 3/2014 | Fischer et al. | 280/743.2 |
| 8,684,404 B2 * | 4/2014 | Fischer et al. | 280/739 |
| 8,684,407 B2 * | 4/2014 | Fischer et al. | 280/743.2 |
| 8,696,022 B2 * | 4/2014 | Fischer et al. | 280/739 |
| 8,727,378 B2 * | 5/2014 | Hiruta et al. | 280/743.2 |
| 8,764,058 B2 * | 7/2014 | Fischer et al. | 280/743.2 |
| 2011/0309605 A1 * | 12/2011 | Kumagai | 280/741 |
| 2013/0134697 A1 * | 5/2013 | Choi et al. | 280/743.2 |
| 2015/0084318 A1 * | 3/2015 | Yamaji et al. | 280/736 |

* cited by examiner

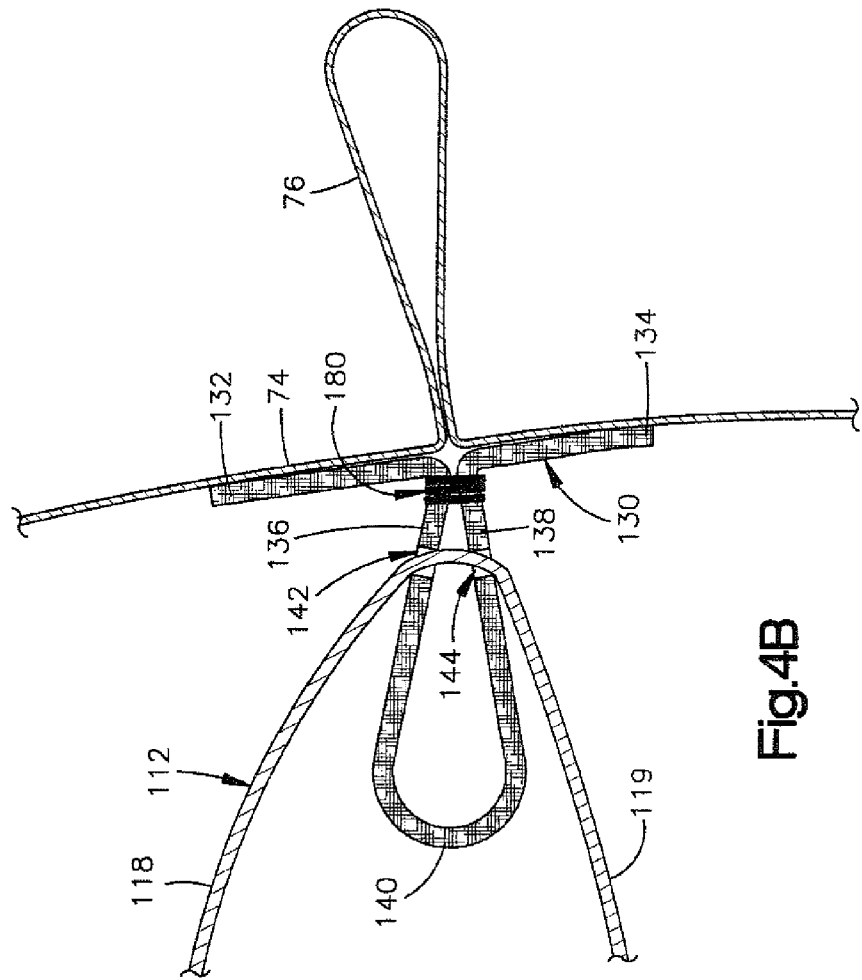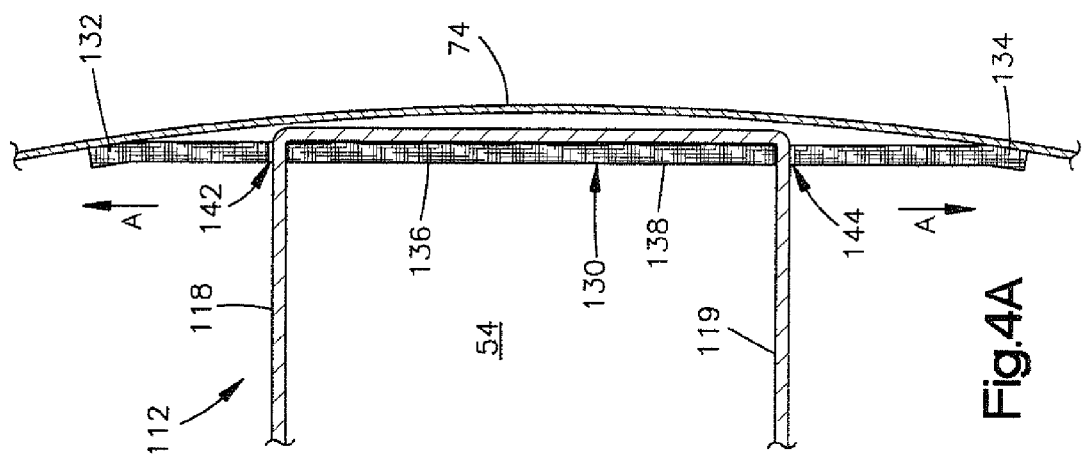

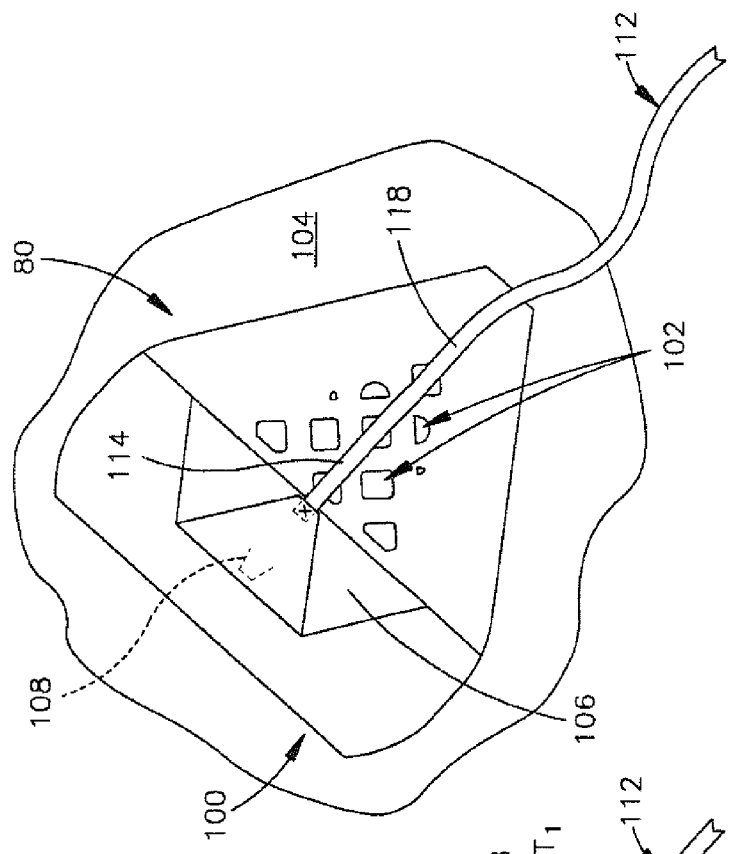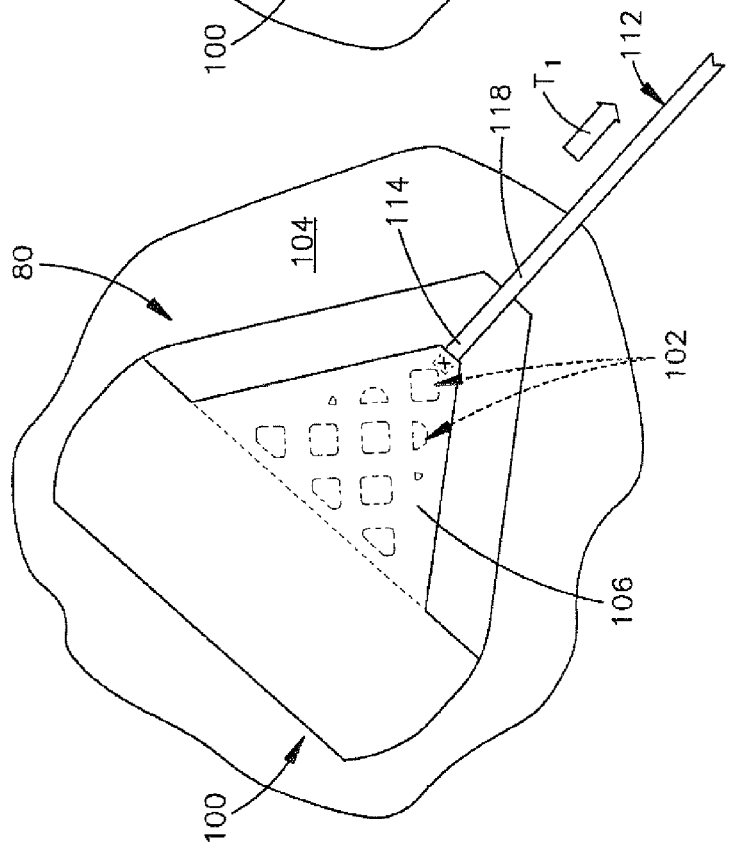

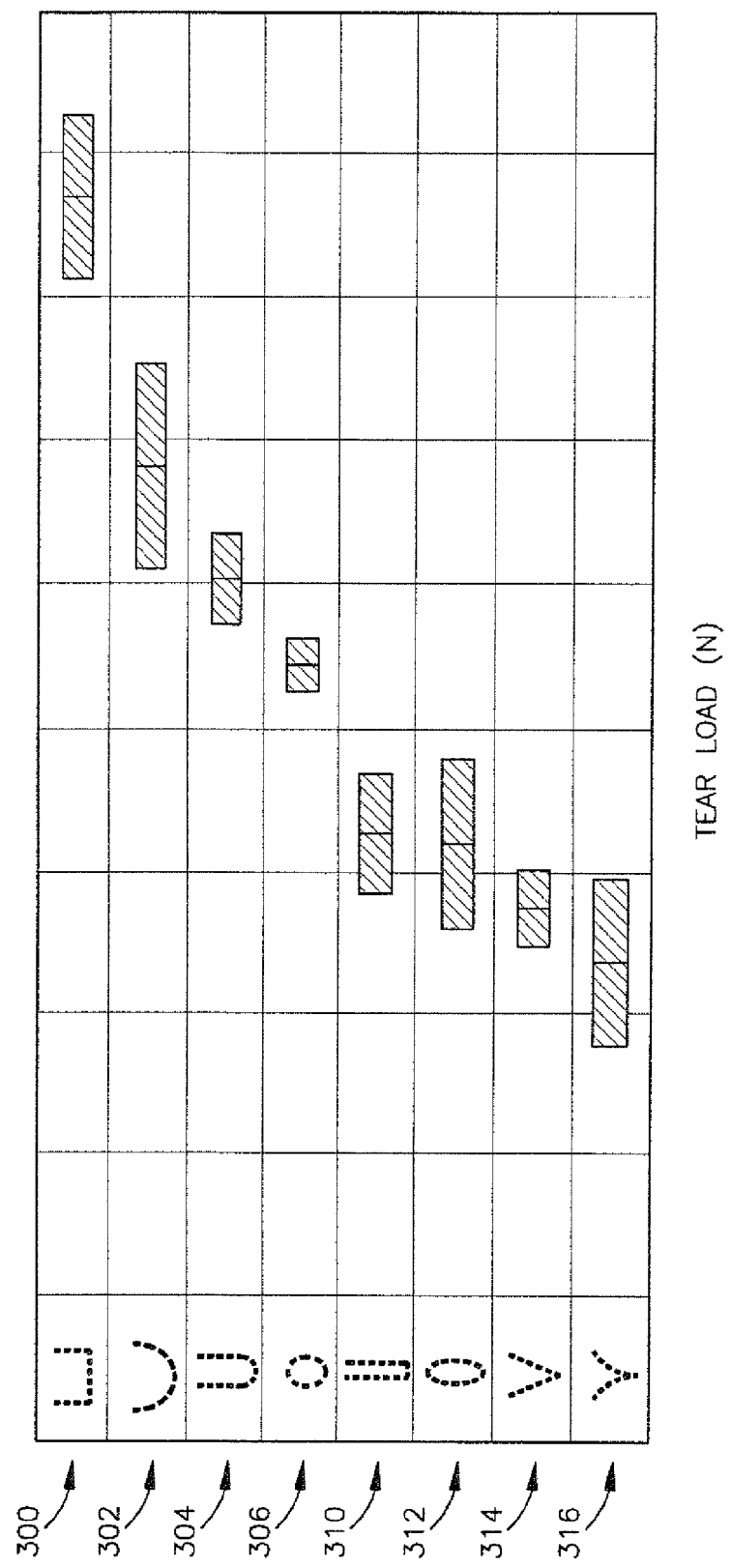

US 9,199,602 B1

PASSIVE AIR BAG WITH SLACK CREATOR

FIELD OF THE INVENTION

The present invention relates to an apparatus for helping to protect an occupant of a vehicle. More particularly, the present invention relates to an air bag inflatable between an instrument panel and a front seat occupant of a vehicle.

BACKGROUND OF THE INVENTION

It is known to provide an inflatable vehicle occupant protection device, such as an air bag, for helping to protect an occupant of a vehicle. One particular type of air bag is a frontal air bag inflatable between an occupant of a front seat of the vehicle and an instrument panel of the vehicle. Such air bags may be driver air bags or passenger air bags. When inflated, the driver and passenger air bags help protect the occupant from impacts with parts of the vehicle such as the instrument panel and/or a steering wheel of the vehicle.

Driver air bags are typically stored in a deflated condition in a housing that is mounted on the vehicle steering wheel. An air bag cover is connectable with the housing and/or steering wheel to help enclose and conceal the air bag in a stored condition. Upon deployment of the driver air bag, the air bag cover opens to permit the air bag to move to an inflated position. The air bag cover opens as a result of forces exerted on the cover by the inflating driver air bag.

Passenger air bags are typically stored in a deflated condition in a housing that is mounted to the vehicle instrument panel. An air bag door is connectable with the housing and/or instrument panel to help enclose and conceal the air bag in a stored condition. Upon deployment of the passenger air bag, the air bag door opens to permit the air bag to move to an inflated position. The air bag door opens as a result of forces exerted on the door by the inflating air bag.

SUMMARY OF THE INVENTION

The present invention includes an apparatus for helping to protect an occupant of a vehicle having an inflatable vehicle occupant protection device inflatable between a vehicle surface and the vehicle occupant. The protection device includes a front panel having a portion presented toward the occupant when the protection device is in an inflated condition. A vent includes at least one opening for releasing inflation fluid from the protection device and has an actuated condition and a non-actuated condition. A tether has a first end connected to the vent for actuating the vent and a second end connected to the protection device. A guide member connected to the front panel slidably receives a portion of the tether between the first and second ends. First and second portions of the guide member are releasably connected together to define a slackened portion. The first and second portions remain connected together in response to initial deployment of the protection device below a predetermined degree to prevent the tether from tensioning such that the vent is in the non-actuated condition. Further deployment of the protection device to the predetermined degree releases the connection between the first and second portions to allow the tether to tension and act on the vent to place the vent in the actuated condition based on the position of the occupant in the vehicle.

The present invention also relates to an apparatus for helping to protect an occupant of a vehicle. The apparatus includes an inflatable vehicle occupant protection device inflatable between a vehicle surface and the vehicle occupant. The protection device includes a front panel having a portion presented toward the occupant when the protection device is in an inflated condition. A vent includes at least one opening for releasing inflation fluid from the protection device and having an actuated condition and a non-actuated condition. A tether includes a first end connected to the vent for actuating the vent and a second end connected to the protection device. A resilient stop is provided on the first end of the tether for providing slack in the first end of the tether. A first guide member is connected to the front panel. A portion of the tether between the first and second ends extends through the first guide member. A second guide member connected to the protection device. The first end of the tether extends through the second guide member for actuating the vent. The tether is slidable relative to the second guide member. The stop is positioned between the vent and the second guide member in response to initial deployment of the protection device below a predetermined degree to prevent the tether from tensioning such that the vent is in the non-actuated condition. Further deployment of the protection device to the predetermined degree causes the stop to pass through the second guide member to allow the tether to tension and act on the vent to place the vent in the actuated condition based on the position of the occupant in the vehicle.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 4A is an enlarged portion of the apparatus of FIG. 1;

FIG. 4B is an enlarged portion of the apparatus of FIG. 2;

FIG. 5A is an enlarged view of a guide member of the apparatus of FIG. 1;

FIG. 5B is an enlarged view of a guide member of the apparatus of FIG. 2;

FIGS. 7 and 8 graphically illustrate properties of the tear stitching of FIGS. 6A and 6B;

DETAILED DESCRIPTION OF THE INVENTION

Figure 1:
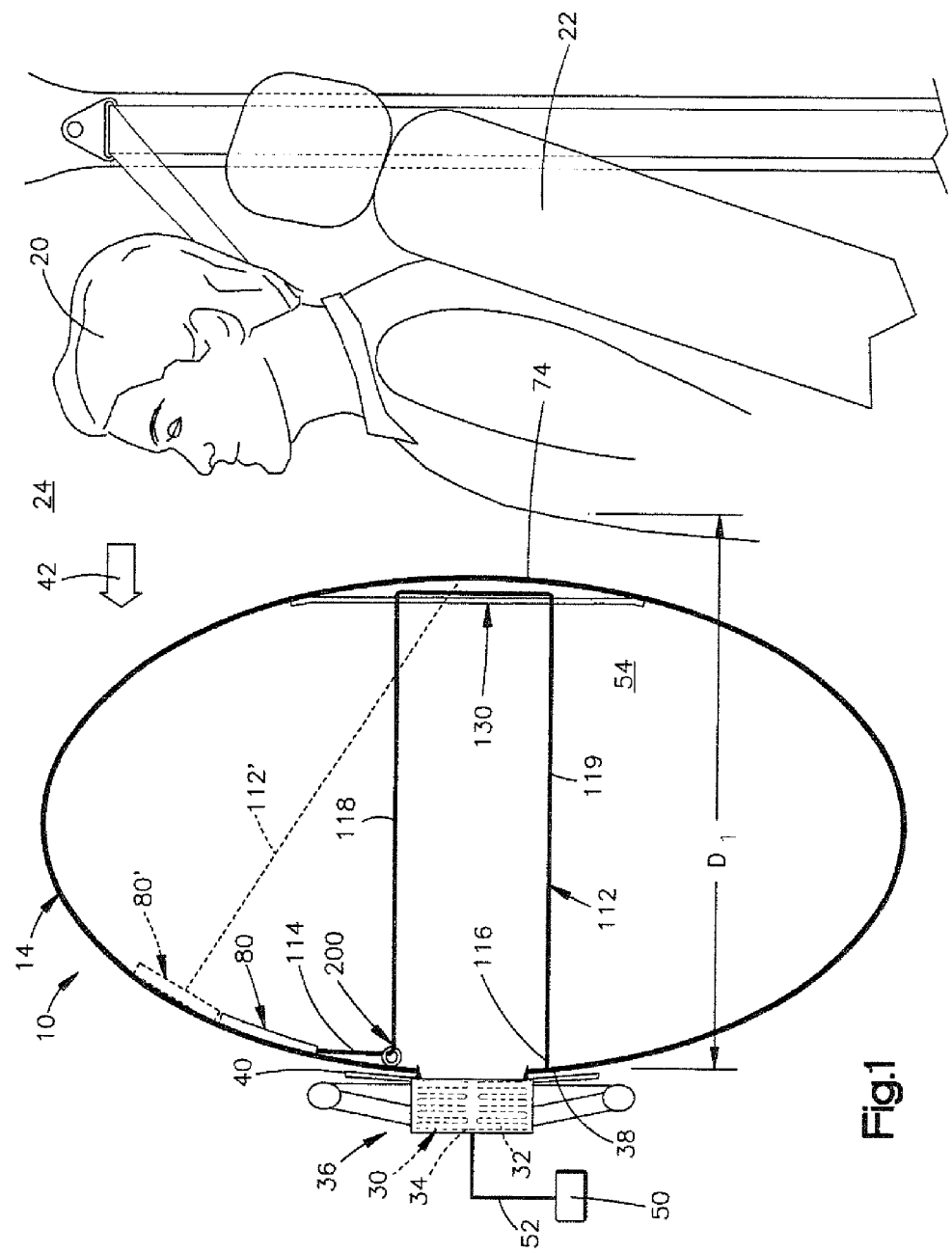
FIG. 1 is a schematic side view illustrating an apparatus for helping to protect an occupant of a vehicle in a first condition according to a first embodiment of the present invention.

The present invention relates to an apparatus for helping to protect an occupant of a vehicle. More particularly, the present invention relates to an air bag inflatable between a steering wheel from which the air bag deploys and a front seat occupant of a vehicle. In an embodiment illustrated in FIG. 1-3, an apparatus 10 for helping to protect an occupant 20 of a vehicle includes an inflatable vehicle occupant protection device 14 in the form of an air bag. In one example, the air bag 14 is a driver frontal air bag for helping to protect an occupant 20 of a seat (not shown) on a driver side 24 of the vehicle. It will be appreciated, however, that the air bag 14 could likewise constitute a passenger frontal air bag for helping to protect an occupant of a seat on a passenger side of the vehicle from striking an instrument panel of the vehicle (not shown).

The air bag 14, when deployed in response to an event for which occupant protection is desired, helps protect the occupant 20 by helping to absorb the force of impact placed on the air bag by the occupant. When the occupant 20 impacts the air bag 14, the occupant penetrates into the air bag, which absorbs and distributes the impact forces throughout the large area and volume of the bag. By "penetrates" into the air bag 14, it is meant to refer to the instance where, in the case of a frontal impact to the vehicle 12, the occupant 20 is moved forward, as indicated by the arrow labeled 42 in FIGS. 1-3, into engagement with the air bag 14.

The "penetration" of the occupant into the air bag 14 is the distance or degree to which the occupant 20 moves into the fully inflated depth of the air bag. The degree of air bag 14 penetration could be measured as the distance the penetrating occupant 20 moves a given point on a front panel 74 of the air bag 14 toward a steering wheel 36 of the vehicle 12 from which the air bag deploys. For example, penetration could be measured as the distance between a point on the front panel 74 and a fixed point on the steering wheel 36 or between a point on the occupant 20, e.g. the occupant's chest, and a fixed point on the steering wheel.

Figure 2:
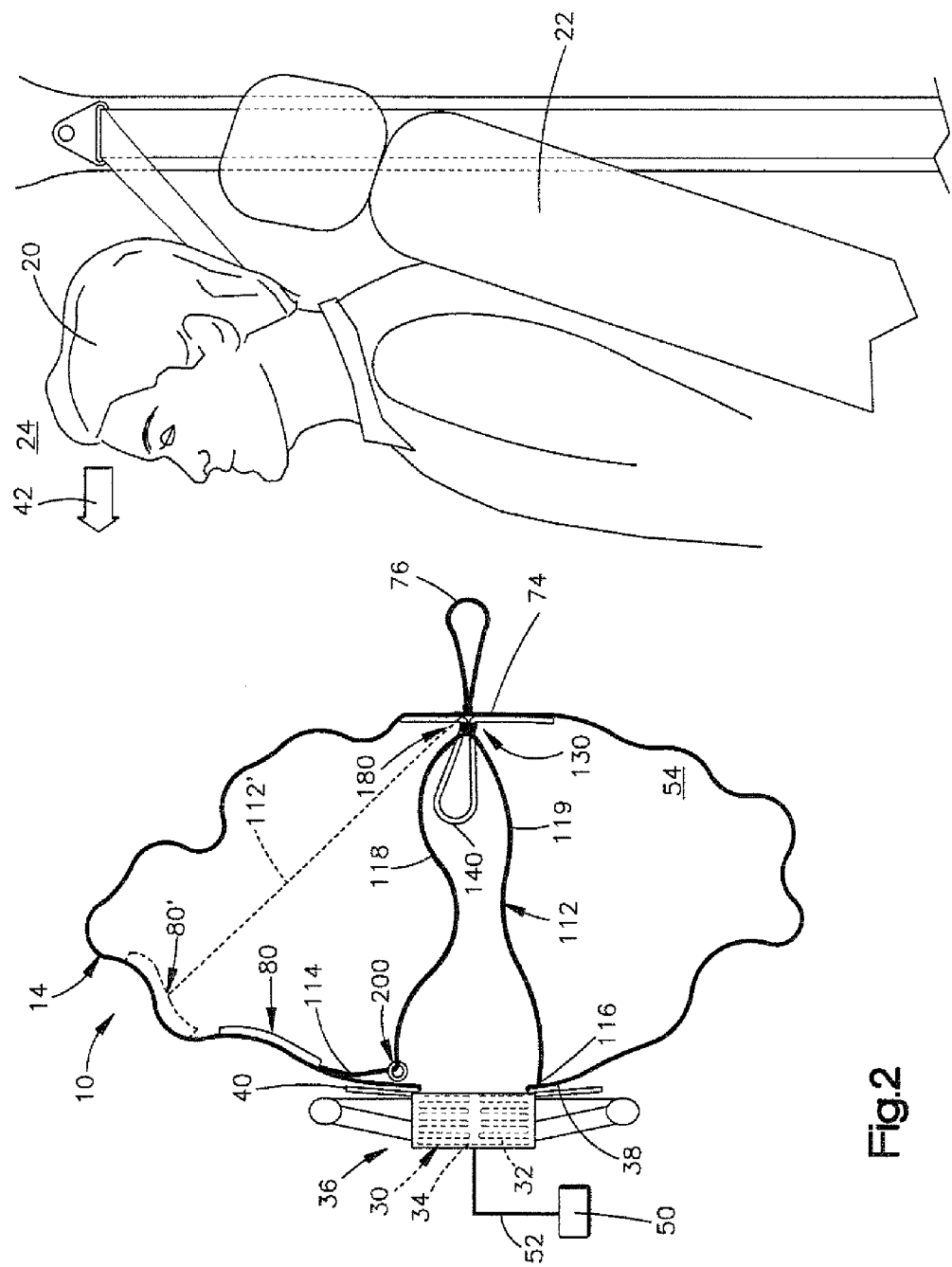
FIG. 2 is a schematic illustration of the apparatus of FIG. 1 in a second condition.

The air bag 14 may be part of an air bag module 30 that includes an inflator 32 and a housing, illustrated in phantom at 34 in FIGS. 1 and 2. The air bag 14 has a stored condition, indicated by dashed lines in FIG. 1, in which the air bag is folded and placed in the housing 34. The module 30 is mounted to the steering wheel 36 of the vehicle 12. The housing 34 helps contain and support the air bag 14 and inflator 32 in the steering wheel 36.

An air bag door 40 is releasably connected to the steering wheel 36 and/or the housing 34. In a closed condition (not shown), the air bag door 40 forms a cover for the module 30 and helps enclose the air bag 14 in the stored condition in the housing 34. The door 40 is movable to an opened condition illustrated in FIG. 1 to uncover an opening in the steering wheel 36 through which the air bag 14 may be deployed from the stored condition in the housing 34. The door 40 may be connected to the vehicle 12, e.g., connected to the steering wheel 36, either directly or through the housing 34, by means (not shown), such as a plastic hinge portion, a strap or a tether.

The inflator 32 is actuatable to provide inflation fluid to an inflatable volume 54 of the air bag 14 to deploy the air bag to the inflated condition. The inflator 32 may be of any known type, such as stored gas, solid propellant, augmented or hybrid. The apparatus 10 includes a sensor, illustrated schematically at 50, for sensing an event for which inflation of the air bag 14 is desired, such as a collision. The inflator 32 is operatively connected to the sensor 50 via lead wires 52.

The air bag 14 can be constructed of any suitable material, such as nylon, e.g., woven nylon 6-6 yarns, and may be constructed in any suitable manner. For example, the air bag 14 may include one or more pieces or panels of material. If more than one piece or panel is used to construct the air bag 14, the pieces or panels may be interconnected by known means, such as stitching, ultrasonic welding, heat bonding or adhesives, to form the air bag. The air bag 14 may be uncoated, coated with a material, such as a gas impermeable urethane or laminated with a material, such as a gas impermeable film. The air bag 14 thus may have a gas-tight or substantially gas-tight construction. Those skilled in the art will appreciate that alternative materials, such as polyester yarn, and alternatives coatings, such as silicone, may also be used to construct the air bag 14.

The air bag 14 may have one or more actuatable features for helping to control or tailor inflation of the air bag in response to vehicle conditions, occupant conditions or both. These features may be actuatable actively, for example, in response to conditions determined via active sensors or passively, for example, having a configuration responsive to physical conditions at the time of inflation. For example, the air bag 14 includes a vent 80 and a tether 112 for selectively actuating the vent. The vent 80 is selectively actuatable to release inflation fluid from the inflatable volume 54 of the air bag 14 in response to tension applied to the tether 112.

The tether 112 is a flexible, elongated member extending from a first end 114 to a second end 116. The first end 114 is secured to a portion of the vent 80 for actuating the vent. The second end 116 is secured to a rear portion 38 of the air bag 14 adjacent the steering wheel 36. The first and second ends 114, 116 are secured to the respective components by known means, such as stitching or welding. The tether 112 is looped between its ends 114, 116 through a tether guide member 130 secured to the front panel 74 within the inflatable volume 54 of the air bag 14. The guide member 130 bifurcates the tether 112 into a first segment 118 extending between the vent 80 and the guide member and a second segment 119 extending between the rear portion 38 and the guide member. In one example, the first and second segments 118, 119 of the tether 112 are integrally formed together.

The guide member 130 constitutes a strip of fabric doubled over onto itself and interconnected at spaced-apart portions by releasable tear stitching 180 to form a slackened portion 140 in the guide member 130 through which the tether 112 extends (see FIG. 2). The slackened portion 140 therefore shortens the guide member 130.

The guide member 130 is secured to the front panel 74 in a manner that also forms a slackened portion 76 in the front panel. The tear stitching 180 is configured to rupture and release the slackened portions 76, 140 when forces acting on the tear stitching, such as tension on the guide member 130, reach or exceed a predetermined magnitude that corresponds with a desired degree of air bag 14 inflation and deployment. In one example, the desired degree of air bag 14 inflation occurs when the air bag becomes fully pressurized, i.e., there is no slack in the air bag fabric. The guide member 130 therefore has a first, shortened condition (FIG. 2) prior to and during air bag 14 pressurization when the slackened portion 140 is held by the tear stitching 180. The guide member 130 also has a second, lengthened condition (FIG. 1 or 3) when the tear stitching ruptures to release the slackened portion 140. Once the slackened portion 140 is released the air bag 14 may close the vent 80 when the occupant is in a normally seated position (see FIG. 1) or vent inflation fluid in response to the penetrating occupant 20 (see FIG. 3).

In the shortened condition (FIG. 2), the guide member 130 prevents actuation of the vent 80 during pressurization of the air bag 14. More specifically, the tear stitching 180 retains the guide member 130 in the shortened condition, which maintains the slackened portion 76 in the front panel 74. Consequently, the tether 112 is slackened and prevented from tensioning and actuating the vent 80 when the guide member 130 is in the shortened condition.

Figure 3:
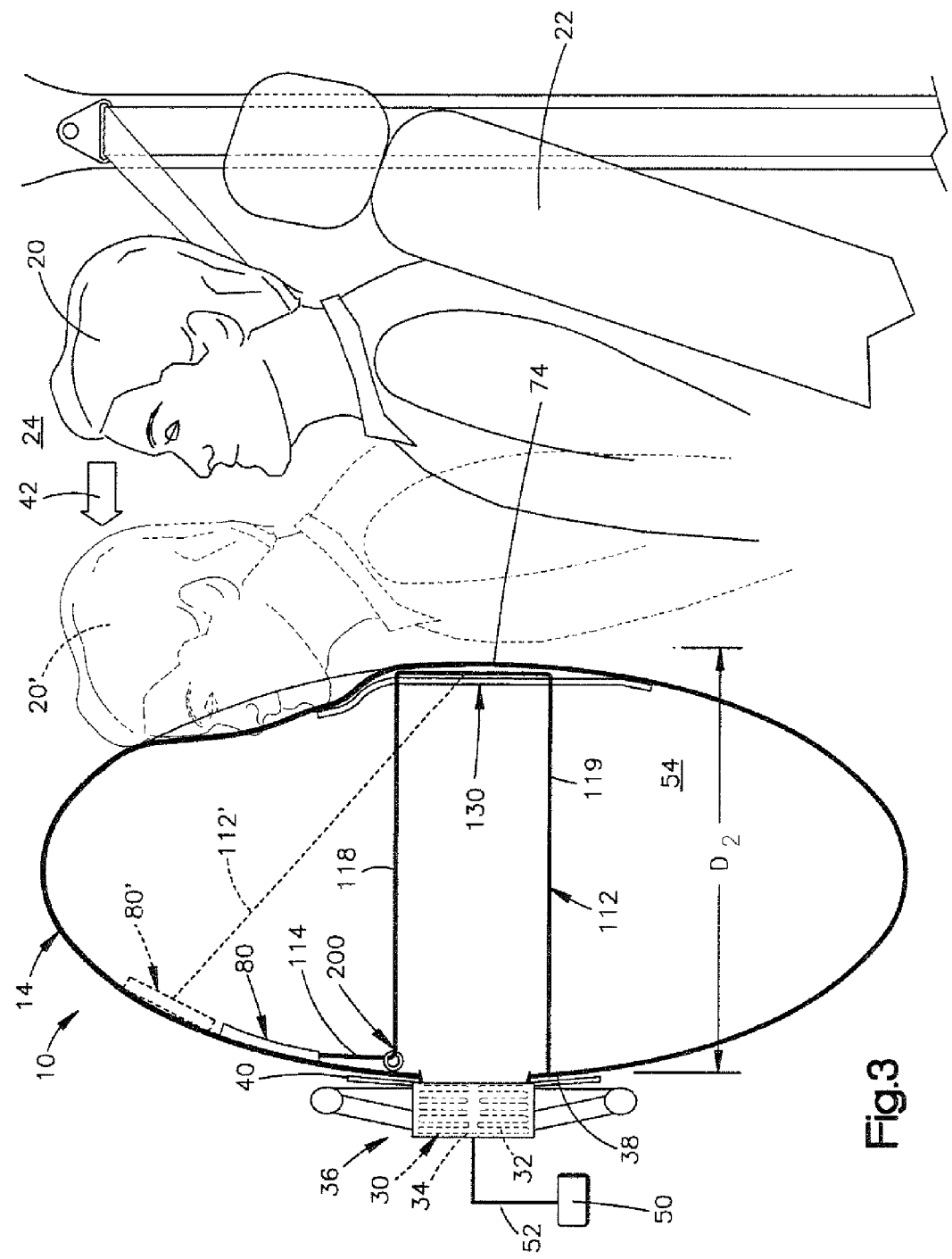
FIG. 3 is a schematic illustration of the apparatus of FIG. 1 in an alternative first condition.

In the lengthened condition (FIG. 1 or 3), the guide member 130 releases the slackened portion 76 to allow the air bag 14 to adapt to vehicle and/or occupant 20 conditions. Referring to FIG. 1, the released slackened portion 76 allows the air bag 14 to reach the fully deployed, large volume condition. More specifically, the tear stitching 180 ruptures to allow the guide member 130 and slackened portion 76 to lengthen, thereby allowing the air bag 14 to expand to the fully deployed condition. As a result, the tether 112 reaches a fully taught condition and actuates the vent 80. Referring to FIG. 3, the released slackened portion 76 allows the fully pressurized air bag 14 to expand but the air bag does not inflate sufficient to tension the tether 112 and actuate the vent 80 due to the presence of the penetrating occupant 20.

FIGS. 4A and 4B illustrate an example of the guide member 130 in accordance with the present invention. The guide member 130 has a lengthened condition (FIG. 4A) allowing the air bag 14 to fully deploy, thereby causing the tether 112 to actuate the vent 80. The lengthened condition of the guide member 130 illustrated in FIG. 4A corresponds with the vehicle 12 and/or occupant 20 conditions illustrated in FIG. 1. The lengthened condition of the guide member 130 illustrated in FIG. 4A also corresponds with the vehicle and/or occupant 20 conditions illustrated in FIG. 3. The guide member 130 has a shortened condition (FIG. 4B) prior to fully pressurization of the air bag 14 and preventing the tether 112 from actuating the vent 80. The shortened condition illustrated in FIG. 4B corresponds with the vehicle 12 and/or occupant 20 conditions illustrated in FIG. 2.

Referring to FIG. 4B, the guide member 130 includes first and second ends 132, 134 secured to the front panel 74 within the inflatable volume 54. The ends 132, 134 may be secured to the front panel 74 by any known means such as stitching, ultrasonic welding, heat bonding or adhesives. The portion of the guide member 130 between the ends 132, 134 is not secured to the front panel 74 and forms the slackened portion 140. A pair of openings 142, 144 is formed in the slackened portion 140 of the guide member 130 for receiving the tether 112 such that the tether extends entirely through the slackened portion and is slidable relative to the slackened portion.

A pair of spaced-apart portions of material 136, 138 of the guide member 130 between the ends 132, 134 are releasably secured together in an adjoining, overlying manner by the releasable tear stitching 180 to form and retain the slackened portion 140. One example of tear stitching 180 for use in the present invention is described and illustrated in U.S. Pat. No. 8,262,130, the entirety of which is incorporated herein by reference. The tear stitching 180 selectively releases the portions of material 136, 138 in a passive manner to release the slackened portion 140 and allow the air bag 14 to reach the fully deployed condition such that the tether 112 actuates the vent 80.

The vent 80 may have an actuated closed configuration capable of cooperating with the tether 112 to provide venting of the air bag 14 in accordance with the description set forth above. Referring to FIGS. 5A and 5B, the vent 80 is an actuated closed vent 100 that is actuatable to prevent inflation fluid from exiting the air bag 14. The vent 100 includes one or more vent openings 102 formed in a side panel 104 of the air bag 14, a vent door 106 secured to the side panel, and the tether 112 secured to the vent door for selectively actuating the vent. The vent door 106 is secured to the side panel 104 by known means (not shown), such as stitching, ultrasonic welding, heat bonding or adhesives.

The vent 100 has a closed condition (FIG. 5A) in which the vent door 106 extends over and covers the vent openings 102 and thereby prevents inflation fluid from passing through the vent openings. The closed condition illustrated in FIG. 5A corresponds with the vehicle 12 and/or occupant 20 conditions illustrated in FIG. 1. The vent 100 has an open condition (FIG. 5B) in which the vent door 106 is positioned away from the vent openings 102 and thereby permits inflation fluid to vent, i.e., flow, through the vent openings. In the open condition, the vent door 106 is folded away from the vent openings 102 and held in place by a releasable tear stitch 108. The open condition illustrated in FIG. 5B corresponds with the vehicle 12 and/or occupant 20 conditions illustrated in FIG. 2 (during air bag 14 pressurization) and FIG. 3 (when an out-of-position occupant 20 penetrates the fully pressurized air bag). The tether 112 is secured to the vent door 106 and may apply tension $T_1$ to the vent door to selectively actuate the vent 100 from the open condition to the closed condition.

Referring to FIGS. 1-3, the first end 114 of the tether 112 may extend through a guide member 200 secured to the air bag 14 in a known manner at a location adjacent the steering wheel 36, e.g., on a rear panel 38 of the air bag 14 opposite and facing the front panel 74. The guide member 200 has a round or ring shape and is formed of air bag 14 material, e.g., fabric. The guide member 200 is sized to allow the tether 112 to slide therethrough and helps to ensure that the actuation sensitivity of the vent 100 is maintained. In particular, the guide member 200 is positioned to guide the tether 112 in a direction extending substantially parallel to movement of the occupant 20 into the air bag 14 such that the tether tensions and slackens in a substantially 1:1 ratio with movement of the front panel 74.

Referring to FIGS. 1-3, upon sensing the occurrence of an event for which inflation of the air bag 14 is desired, such as a vehicle collision, the sensor 50 provides a signal to the inflator 32 via the lead wires 52. Upon receiving the signal from the sensor 50, the inflator 32 is actuated and provides inflation fluid to the inflatable volume 54 of the air bag 14 in a known manner. The inflating air bag 14 exerts a force on the door 40, which moves the door to the opened condition. The air bag 14 inflates from the stored condition to a deployed condition, such as the fully inflated and deployed condition illustrated in FIG. 1. The air bag 14, while inflated, helps protect the vehicle occupant 20 from impacts with parts of the vehicle 12, such as the steering wheel 36.

When an event occurs in which inflation of the air bag 14 is desired, the vent 80, tether 112, and guide member 130 respond to vehicle conditions, occupant conditions or both to help control inflation and deployment of the air bag. For example, the vent 80 may adapt based on the position of the occupant 20 upon the occurrence of the event for which inflation of the air bag 14 is desired. Prior to such an event, the vent 80 is in the open, non-actuated condition while stored in the air bag module 30. If, upon the occurrence of an event for which inflation of the air bag 14 is desired, the occupant 20 is in the normally seated position of FIG. 1, the vent 80 is actuated to the closed condition and the air bag 14 inflates to the normally deployed condition due to the cooperation of the tether 112 and vent.

In the normally seated condition, the occupant 20 is spaced from the air bag 14 and must move forward in order to engage and penetrate the air bag. This distance can be measured in terms of occupant chest to steering wheel 36 distance, which is indicated at $D_1$ in FIG. 1. The distance that the occupant 20 must travel before this engagement takes place can vary depending on the occupant/seat position prior to air bag deployment. In this configuration, the air bag 14 may also be constructed such that the tether 112 does not actuate the vent 80 in response to the obstructed deployment of the air bag 14 when, for example, the occupant 20 is away from the normally seated position and penetrates the air bag. The degree of penetration in FIG. 3 can be calculated as the difference between the inflated depth $D_1$ in FIG. 1 and the penetrated depth, labeled $D_2$ in FIG. 3.

As the air bag 14 inflates and pressurizes (see FIG. 2) the front panel 74 moves away from the steering wheel 36, thereby moving the guide member 130 secured to the front panel away from the steering wheel and lengthening the tether 112. Consequently, the guide member 130 becomes taught and tension is applied to the tear stitching 180 securing the slackened portion 140 prior to the tether 112 becoming taught. Since the first end 114 of the tether 112 is not tensioned the vent 80 remains in the non-actuated condition at this stage of deployment. When the air bag 14 reaches a threshold or predetermined pressure, e.g., a fully pressurized condition, tension on the guide member 130 is sufficient to rupture the tear stitching 180, thereby releasing the slackened portion 140 and allowing the front panel 74 to move further outward with the expanding air bag 14 toward the fully inflated and deployed condition of FIG. 1.

Referring to FIG. 4A, once the slackened portion 140 (shown in FIG. 4B) is released, the portions of material 136, 138 move away from one another as the ends 132, 134 of the guide member 130 move outward in the direction indicated by the arrows A with the expanding air bag 14, i.e., the guide member straightens and lengthens along the contour of the front panel 74. The lengthening of the guide member 130 is possible due to the lengthening of the slackened portion 76 in the front panel 74, which is free to straighten and lengthen in the direction A under the inflation fluid pressure once the tear stitching 180 ruptures. When both slackened portions 76, 140 lengthen the entire guide member 130 moves outwardly with the expanding air bag 14, which tensions both segments 118, 119 of the tether 112.

Tensioning of the tether 112 occurs until the front panel 74 reaches a predetermined distance away from the steering wheel 36, at which point the entire tether becomes tensioned. Referring to FIG. 5A, further inflation of the air bag 14 thereafter causes the tether 112 to pull on the vent door 106 and ultimately actuate the vent 80. More specifically, the tensioning force $T_1$ applied to the vent door 106 by the now taught first segment 118 breaks or otherwise ruptures the tear stitching 108 and moves the door portion to the closed condition of FIG. 5A. The vent door 106 blocks inflation fluid flow through the vent openings 102, allowing the air bag 14 to inflate to the normally deployed and pressurized condition of FIG. 1.

Referring to FIG. 3, if, upon the occurrence of the event, the occupant 20 is positioned away from the normally seated position, the occupant may impede or restrict the air bag 14 from reaching the fully inflated position. This may occur when the occupant 20 is leaned forward and/or unbuckled so as to impede inflation of the air bag 14. In this case, the air bag 14 is pressurized sufficient to rupture the tear stitching 180, but the first segment 118 of the tether 112 is not sufficiently tensioned and, thus, the vent 80 remains in the open, non-actuated condition (see FIG. 5B). As a result, pressurization of the air bag 14 through the open vent 80 is limited and, thus, the air bag inflates and deploys to the small volume condition of FIG. 3.

More specifically, when the occupant 20 is positioned away from the normally seated position the front panel 74 is only capable of moving the distance $D_2$ away from the steering wheel 36. The distance $D_2$ corresponds with an air bag 14 that is fully pressurized but the inflation depth or pressure is below the predetermined amount necessary to adequately tension the first segment 118 of the tether 112. Consequently, the tether 112 applies no tension to the vent 80 and, thus, the vent remains non-actuated when the occupant 20 is positioned away from the normally seated position.

One having ordinary skill in the art will readily understand that the tether 112 and tear stitching 180 of the present invention help ensure that the vent 80 is reliably actuated when the occupant 20 is in the normally seated position. Likewise, the tether 112 and tear stitching 180 help ensure the vent 80 reliably remains non-actuated during pressurization of the air bag 14 and when the occupant 20 is positioned away from the normally seated position. More specifically, the first segment 118 of the tether 112 does not and cannot fully tension unless the tear stitching 180 ruptures to release the slackened portion 140 and allow the slackened portion 76 of the front panel 74 to lengthen. The first segment 118 therefore cannot actuate the vent 80 unless the tear stitching 180 on the guide member 130 ruptures and the front panel 74 moves a distance away from the steering wheel 36 sufficient to fully tension the tether 112. Since the tear stitching 180 only ruptures when the air bag 14 inflates over a predetermined amount it is clear that the vent 80 does not actuate until the air bag 14 is sufficiently inflated. Consequently, venting of the air bag 14 is reliably controlled by the tether 112, guide member 140, and tear stitching 180 of the present invention.

Referring to FIG. 1, in a typical air bag construction the vent (shown in phantom at 80') is actuated by a single segment tether (shown in phantom at 112') secured to and between the vent 80' and the air bag 14. During inflation and deployment, the initial slack in the single segment tether 112' allows the vent 80' to move or shift positions about the air bag 14. Due to this movement, the vent 80' may move to an undesirable position on the air bag 14 during deployment that prematurely tensions the tether 112'. Consequently, the typical tether 112' may apply tension to the vent 80' prior to the air bag 14 becoming pressurized to the degree to which actuation of the vent is desired.

The slackened portion 140 and tear stitching 180 of the present invention help ensure the vent 80 reaches its desired position on the air bag 14 during deployment prior to being actuated. The first end 114 of the tether 112 does not and cannot apply tension to the vent door 106 sufficient to actuate the vent 80 until or unless the front panel 74 reaches the predetermined distance from the steering wheel 36. As noted, however, the front panel 74 may only reach the predetermined distance from the steering wheel 36 if the tear stitching 180 ruptures to release the slackened portion 140. Consequently, the vent 80 of the present invention cannot be actuated until or unless the tear stitching 180 releases the slackened portion 140, thereby allowing the vent to reach the desired position on the air bag 14 before being actuated.

The air bag 14 is configured such that the time difference between the onset of air bag inflation and the release of the slackened portion 140 is sufficient to allow the vent 80 to reach its proper, predetermined position on the air bag. Subsequent actuation of the vent 80 will therefore occur only while the vent is properly oriented in the air bag 14, thereby ensuring the vent not only actuates at the proper time but also while in the proper position.

According to the present invention, a rupturable tear stitch configuration that promotes predictability, repeatability, and reliability in releasing interconnected fabrics is used to form the tear stitchings 108 and 180. The tear stitchings 108 and 180 illustrated in FIGS. 4A-4B and FIGS. 5A-5B are two examples of potential implementations of the tear stitch configuration of the present invention. Those skilled in the art will appreciate that the tear stitch configuration of the present invention may be implemented to provide a releasable connection between any desired fabric components of a vehicle occupant protection device.

Figure 6A:
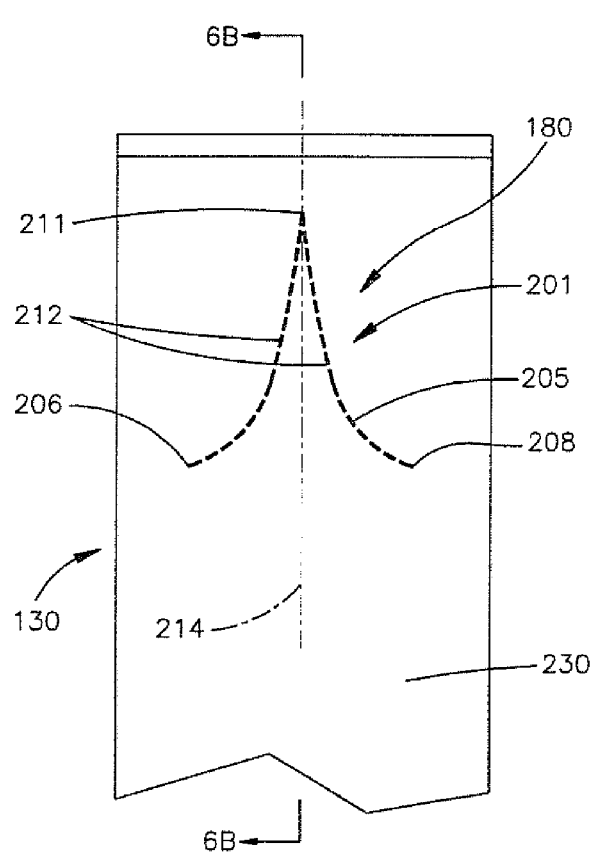
FIG. 6A is an enlarged schematic view illustrating tear stitching for the apparatus of FIG. 1 in accordance with an aspect of the present invention.
Figure 6B:
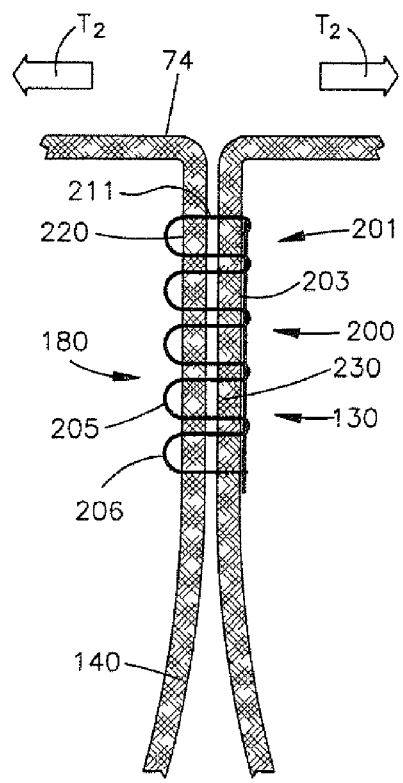
FIG. 6B is a sectional view taken generally along line 6B-6B in FIG. 6A.

FIGS. 6A and 6B illustrate an example tear stitching 201 in accordance with the present invention. The tear stitching 201 may constitute the tearing stitching 180 and/or the tear stitching 108 of FIGS. 1-5B. In FIGS. 6A and 6B, the tear stitching 201 constitutes the tear stitching 180 for selectively releasing the slackened portion 140 of the tether 112. The tear stitching 201 interconnects first and second portions of material 220 and 230 positioned in an adjacent and overlying manner.

As representative of the tear stitching 180 in FIGS. 1-5B, the first and second portions of material 220 and 230 may correspond to the overlying portions 136, 138 of the guide member 130 forming the slackened portion 140. In this instance, the first and second portions of material 220, 230 constitute any spaced-apart portions of the guide member 130 between the ends 132, 134 and may be overlayed with one another in any manner any number of times. As another example, representative of the tear stitching 108 in FIGS. 5A and 5B, the first portion of material 220 may correspond to the vent door 106 and the second portion of material 230 may correspond to the side panel 104 of the air bag 14 (not shown).

The tear stitching 201 may be constructed using conventional sewing techniques and equipment. The tear stitching 201 includes a bobbin thread 203 and a stitch thread 205. The stitch thread 205 extends through the first and second portions 220 and 230 and loops around the bobbin thread. As best shown in FIG. 6A, the tear stitching 201 is a line of stitching having a start point 206 and an end point 208. A break point 211 is located between, e.g., at the midpoint between, the start point 206 and the end point 208. The break point 211 is the point along the tear stitching 201 where it is intended that the tear stitching rupture under tension.

The tear stitching 201 has an inverted, generally curved V-shaped configuration with outwardly diverging curved segments or legs 212 that meet at the break point 211. The tear stitching 201 is arranged such that an axis of symmetry 214 of the tear stitching extends generally perpendicular to the two opposed directions in which tension, indicated generally by the arrows labeled $T_2$ in FIGS. 6A and 6B, is applied to the first and second portions 220 and 230. The axis of symmetry 214 bisects the V-shaped configuration of the tear stitching 201.

The tear stitching 201 is configured to rupture in response to the tension $T_2$ applied to the first and second portions of material 220 and 230. This tension $T_2$ may correspond, for example, to the tension applied to the overlying portions of the guide member 130 or to the tension applied to the vent door 106 and side panel 104 during deployment of the air bag 14. The first and second portions of material 220 and 230 are arranged such that the tension $T_2$ applied to the portions results in a peeling action or motion between the portions, which acts on the tear stitching 201. In the embodiment illustrated in FIGS. 6A and 6B, this peeling action is produced by positioning the break point 211 closest to the front panel 74. When the tension $T_2$ is applied to the first and second portions of material 220, 230 as the ends 132, 134 of the guide member 140 move away from one another relative to the tear stitching 201, the resulting peeling action helps focus the tension on the break point 211 of the tear stitching.

According to the present invention, the predictability, reliability, and repeatability with which the tear stitching 201 ruptures in response to the tension $T_2$ is tailored through the selection of materials and configuration of the tear stitching. The generally inverted V-shaped configuration of the tear stitching 201 illustrated in FIGS. 6A and 6B, which is oriented generally parallel to the tension $T_2$, focuses the tension $T_2$ on the break point 211. Thus, it will be appreciated that the tension $T_2$ is focused primarily on the few, e.g., 1 or 2, stitches that make up the break point 211 of the tear stitching 201.

Since the tension $T_2$ is focused on the break point 211, the tear stitching 201 begins to rupture when the stitch thread 205 at the break point ruptures and begins to unravel from the material 220 and 230. The stitch thread 205, having a known tensile strength, will rupture when the tension $T_2$ reaches a known value. Since the break point 211 comprises only a few stitches of the stitch thread 205, the number of variables that could affect the tension $T_2$ at which the tear stitching begins to rupture is reduced as opposed to, for example, tear stitching in which the tension is spread over a large number of stitches. Therefore, predictable, reliable, and repeatable rupturing of the tear stitching 201 can be achieved by selecting a stitch thread 205 with an appropriate tensile strength based on known vehicle conditions and/or occupant conditions.

To help ensure the tear stitching 201 ruptures when tension $T_2$ reaches a predetermined threshold level, the bobbin thread 203 may be selected to have a tensile strength greater than the stitch thread 205. This will help ensure that the stitch thread 205 ruptures first under the tension $T_2$ and thus helps improve the predictability, reliability, and repeatability with which the entire tear stitching 201 ruptures. Consequently, the tear stitching 201 of the present invention helps to increase the reliability of the vent 80 actuating only when the first segment 118 of the tether 112 is fully tensioned upon rupture of the tear stitching 201 and release of the slackened portion 140.

Also, according to the present invention, the leg portions 212 of the tear stitching 201 may be designed to be just sufficient to maintain a predetermined strength for the connection between the overlying portions of material 220 and 230. By so designing the leg portions 212, the amount of tear stitching 201 that needs to unravel in order to release the portions 220 and 230 is minimized. This helps increase the speed at which the tear stitching 201 ruptures when the tension $T_2$ reaches the desired magnitude, which can further promote the predictability, reliability, and repeatability with which the tear stitching 201 ruptures. Through testing and evaluation, it was determined that the performance of the tear stitching 201 can be affected through the stitch configuration, e.g., the shape of the tear stitching. To make this determination, various stitch configurations and thread types were tested to determine the load at which the tear stitching ruptured. The results of these tests are illustrated in the chart of FIG. 7.

Referring to FIG. 7, various stitch shapes were tested to determine the load at which the tear stitching ruptured. In all of the tests, the tear stitching interconnected overlying portions of material in the same manner as that illustrated in FIGS. 6A and 6B. In each test, the tear stitching was oriented in a manner similar or identical to that shown in FIGS. 6A and 6B. In particular, the tear stitching was oriented such that the axis of symmetry of the tear stitching extended generally perpendicular to the opposite directions in which the tension is applied to the first and second portions of material, thus focusing the tension primarily on the break point for that particular stitch configuration.

As shown in FIG. 7, the generally curved V-shaped configuration shown and described in FIGS. 6A and 6B and along with seven other stitch configurations were tested. In each stitch configuration, the stitch thread was Tex-30 Nylon thread and the bobbin thread was Tex-138 Nylon with a stitch size of about 3 millimeters and a thread tension of about 120 cN (1.2 Newtons). The overlying portions of material were constructed of 700 dtex woven Nylon coated with silicone on one side.

The tests were conducted on eight different tear stitching configurations: square U-shaped tear stitching 300, semi-circular tear stitching 302, curved U-shaped tear stitching 304, O-shaped tear stitching 306, skinny square U-shaped tear stitching 310, oval-shaped tear stitching 312, straight V-shaped tear stitching 314, and curved V-shaped tear stitching 316. The curved V-shaped tear stitching 316 was identical to that illustrated in FIGS. 6A and 6B. Each of these tear stitching configurations incorporated ten stitches, except the skinny square U-shaped tear stitching 310, which incorporated 11 stitches. For each stitch configuration, the overlying portions of material were arranged as shown in FIGS. 6A and 6B and interconnected via the tear stitching. For the circular tear stitching 306 and the oval shaped tear stitching 312, the start and end points were located opposite the break point. Tension was applied as shown in FIGS. 6A and 6B until the tear stitching ruptured, at which point the magnitude of the tension was recorded.

The testing was performed five to six times per stitch configuration. Based on the results of the tests, known statistical methods were employed to determine the expected performance for each stitch configuration with confidence intervals of 95%. The confidence levels for each stitch configuration are illustrated in the shaded areas associated with each stitch configuration in FIG. 7. By "95% confidence intervals," it is meant that, for each stitch configuration, the average rupture tension will fall within the range defined by the shaded areas 95% of the time. Thus, for example, for the curved V-shaped stitch configuration 316, the average rupture load will fall within the range of about 55-79 Newtons 95% of the time.

From the above, those skilled in the art will appreciate that, according to the present invention, the strength of the rupturable tear stitching 201 can be tailored through the configuration or shape of the tear stitching itself without altering the thread type and while maintaining a consistent, e.g., minimal, number of stitches. This allows the rupture strength of the tear stitching 201 to be tailored to performance criteria that may be application specific, even within the same overall application.

For example, referring to FIGS. 1-5B, it may be desirable that the rupture strength of the tear stitching 108 used to secure the vent door 106 be less than the rupture strength of the tear stitching 180 used to secure the slackened portion 140 of the guide member 130. In this instance, the desired performance can be achieved, for example, by using the square U-shaped stitch configuration 300 (see FIG. 7) or semi-circular stitch configuration 302 for the tear stitching 180 so that the slackened portion 140 remains secured and the first segment 118 slackened due to relatively strong tear stitching. In a similar manner, straight V-shaped stitch configuration 314 or curved V-shaped stitch configuration 316 can be used for the tear stitching 108 so that the vent door 106 is maintained in the open condition by comparatively weaker tear stitching.

Through testing and evaluation, it was determined that the performance of the tear stitching 201 can also be affected by the type of thread used to construct the tear stitching. To make this determination, threads of various types were used to form three of the stitch configurations described above. These stitch configurations with the various threads were tested to determine the load at which the tear stitching ruptured. The results of these tests are illustrated in the chart of FIG. 8.

Figure 8:
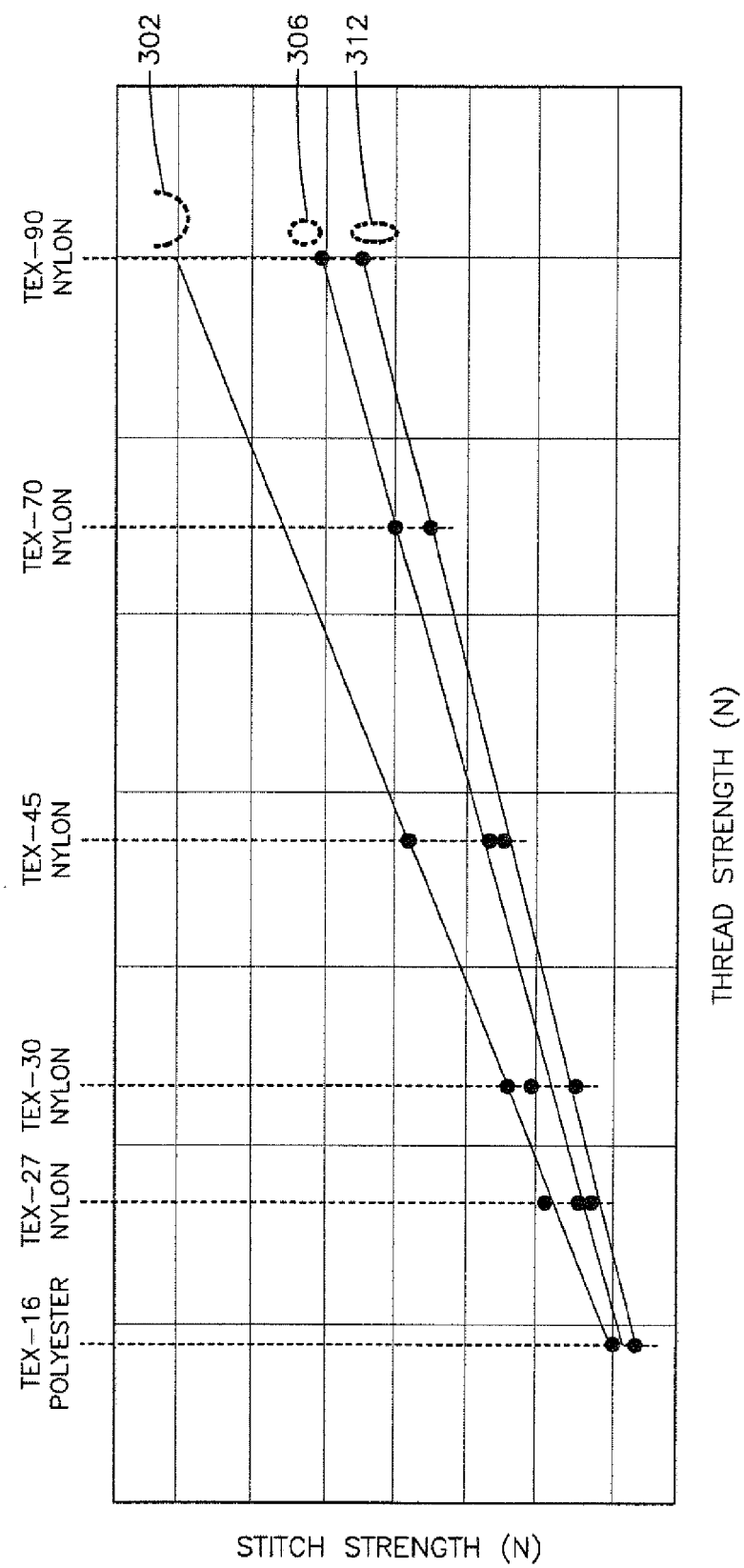

Referring to FIG. 8, the stitch configurations used to perform the tests were the semi-circular tear stitching 302, the circular tear stitching 306, and the oval-shaped tear stitching 312. In all of the tests, the tear stitching interconnected overlying portions of material in the same manner as that illustrated in FIGS. 6A and 6B. In each test, the tear stitching was oriented in a similar or identical manner as that shown in FIGS. 6A and 6B. For the circular tear stitching 306 and the oval shaped tear stitching 312, the start and end points were located opposite the break point. In particular, the tear stitching was oriented such that the axis of symmetry of the tear stitching extended generally perpendicular to the opposite directions in which the tension $T_2$ was applied to the first and second portions of material, thus focusing the tension primarily on the break point. Each stitch configuration included ten stitches, the stitch size was about 3 millimeters, and the thread tension was about 120 cN (1.2 Newtons). The overlying portions of material were constructed of 700 dtex woven Nylon with a silicone coating applied on one side.

The tests were conducted on six different thread types for each stitch configuration: Tex-16 polyester thread, Tex-27 Nylon, Tex-30 Nylon, Tex-45 Nylon, Tex-70 Nylon, and Tex-90 Nylon. For each stitch configuration, the overlying portions of material were arranged as shown in FIGS. 6A and 6B and interconnected via the tear stitching. Tension $T_2$ was applied, as shown in FIGS. 6A and 6B until the tear stitching ruptured, at which point the magnitude of the tension was recorded. For each of the six thread types, the test was repeated 5-6 times on each of the three stitch configurations.

The chart of FIG. 8 illustrates the results of the tests. In FIG. 8, the horizontal axis represents the tensile strength of the six different threads used in the tests. As illustrated in FIG. 8, the Tex-16 polyester thread has a tensile strength of about 1.8 Newtons, the Tex-27 nylon thread has a tensile strength of about 3.4 Newtons, the Tex-30 nylon thread has a tensile strength of about 4.7 Newtons, the Tex-45 nylon thread has a tensile strength of about 7.5 Newtons, the Tex-70 nylon thread has a tensile strength of about 11 Newtons, and the Tex-90 nylon thread has a tensile strength of about 14 Newtons. The vertical axis represents the stitch strength of the three stitch configurations using the different thread types.

In FIG. 8, the dots plotted on the chart represent average rupture strengths of the three stitch configurations using the different threads. For example, for the semi-circular stitch configuration 302 using the Tex-45 nylon thread, the average rupture strength was about 190 Newtons. As another example, for the circular stitch configuration 306 using the Tex-45 nylon thread, the average rupture strength was about 135 Newtons. As a further example, for the elliptical stitch configuration 312 using the Tex-45 nylon thread, the average rupture strength was about 125 Newtons. At this point, it should be noted that average stitch strengths for the semi-circular tear stitch configuration 302 using the Tex-70 and Tex-90 nylon threads were not recorded because the strength of the tear stitching exceeded 250 Newtons, which was the maximum tension that the device used to measure the tension was capable of measuring.

Based on the results presented in FIG. 8, it will be appreciated that as the thread strength increases, the strength of the tear stitching also increases. The lines plotted on the chart and associated with the stitch configurations approximate the relationship between thread strength and the strength of the tear stitching using a best-fit algorithm. These plotted lines illustrate that this relationship is approximately linear.

From the above, those skilled in the art will appreciate that, according to the present invention, the strength of the rupturable tear stitching 201 can be tailored through the selection of the thread used to construct the tear stitching without altering the configuration or shape of the tear stitching itself and while maintaining a consistent, e.g., small, number of stitches. This also allows the rupture strength to be tailored to performance criteria that may be application specific, even within the same overall application.

Combining the relationships illustrated in FIGS. 7 and 7, those skilled in the art will further appreciate that, according to the present invention, the strength of the rupturable tear stitching 201 can be tailored through a combination of selecting the type of thread used to construct the tear stitching and the configuration or shape of the tear stitching while maintaining a consistent, e.g., small, number of stitches.

This also allows the rupture strength to be tailored to performance criteria that may be application specific, even within the same overall application.

For example, referring to FIGS. 1-5B, it may be desirable that the rupture strength of the tear stitching 108 used to secure the vent door 106 be less than the rupture strength of the tear stitching 180 used to secure the guide member 130. In this instance, the desired performance can be achieved, for example, by using the Tex-70 or Tex-90 nylon thread with a square U-shaped stitch configuration 300 or semi-circular stitch configuration 302 to construct the tear stitching 180, and by using Tex-16 polyester or Tex-27 nylon thread with a V-shaped stitch configuration 314 or curved V-shaped stitch configuration 316 to construct the tear stitching 108.

Figure 9:
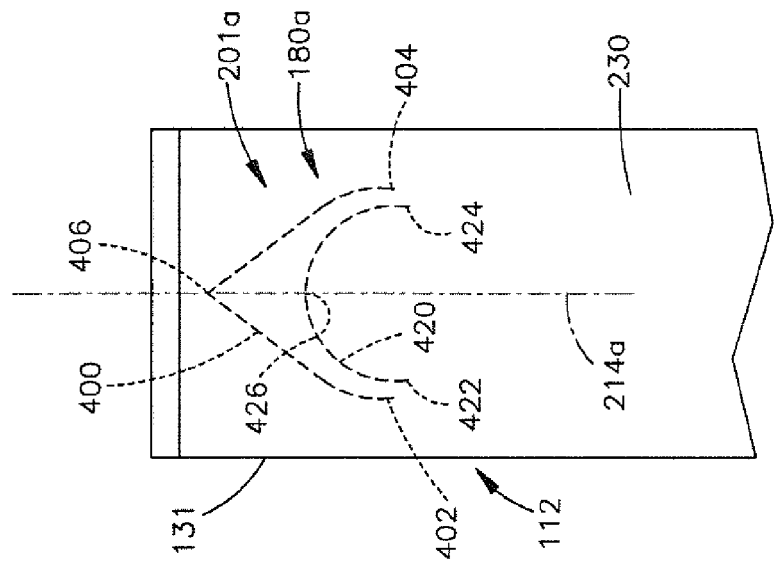
FIG. 9 is an enlarged schematic view illustrating tear stitching according to another aspect of the present invention.

FIG. 9 illustrates by way of example tear stitching 201a in accordance with another aspect of the present invention. Similar to the tear stitching 201 of FIGS. 6A and 6B, the tear stitching 201a may represent the tear stitching 108 and/or the tear stitching 180 of FIGS. 1-5B. As shown in FIG. 9, the tear stitching 201a includes two rupturable stitch lines: a first stitch line 400 and a second stitch line 420. The first and second stitch lines 400 and 420 may be constructed using conventional sewing techniques and equipment and include a bobbin thread and a stitch thread (not shown) as described above in regard to the embodiment of FIGS. 6A and 6B.

The first stitch line 400 has a start point 402, an end point 404, and a break point 406 located between, e.g., at the midpoint between, the start and end points. The break point 406 is the point along the first stitch line 400 where it is intended that the stitching begins to rupture under tension. Similarly, the second stitch line 420 has a start point 422, an end point 424, and a break point 426 located between, e.g., at the midpoint between, the start and end points. The break point 426 is the point along the second stitch line 420 where it is intended that the stitching begins to rupture under tension.

The first and second stitch lines 400 and 420 may have any of the shapes or configurations described above and illustrated in FIG. 7. The first and second stitch lines 400 and 402 may also have any of the material constructions described above and illustrated in FIG. 8. According to the present invention, the shape, configuration, and material construction of the first and second stitch lines 400 and 420 may be selected to tailor the stitching 201a to perform desired functions and to exhibit desired performance characteristics.

The first stitch line 400 has the inverted, generally curved V-shaped configuration described above and the second stitch line 420 has the semi-circular configuration described above. The tear stitching 201a is arranged such that an axis of symmetry 214a of the tear stitching extends generally perpendicular to the opposite directions in which tension (not shown but in the same directions as the tension $T_2$ in FIGS. 6A and 6B), is applied to the first and second portions 220 and 230. These configurations, along with their material constructions, are selected to tailor the tear stitching 201a to perform desired functions and to exhibit desired performance characteristics.

The tear stitching 201a is configured to rupture in response to the tension applied to the first and second portions of material 220 and 230. This tension may correspond, for example, to the tension applied to the vent door 106 and side panel 104 during deployment of the air bag 14. This tension may also correspond, for example, to the tension applied to the overlying portions 136, 138 of the guide member 130.

As shown in FIG. 9, the first and second portions of material 220 and 230 are arranged such that the tension applied to the portions results in a peeling action of motion between the portions, which acts on the tear stitching 201a. In this embodiment, this peeling action is produced by positioning the break point 406 closest to the front panel 74. When the tension is applied to the first and second portions of material 220, 230 as the ends 132, 134 of the guide member 140 move away from one another relative to the tear stitching 201a, the resulting peeling action helps focus the tension on the break point 406 of the tear stitching.

Since the tension is focused initially on the break point 406, the first stitch line 400 begins to rupture when the stitch thread at the break point ruptures and begins to unravel from the material 220 and 230. The stitch thread, having a known tensile strength, will rupture when the tension reaches a known value. Since the break point 406 comprises only a few stitches of the stitch thread, the number of variables that could affect the tension at which the first stitch line 400 begins to rupture is reduced as opposed to, for example, tear stitching in which the tension is spread over a large number of stitches.

The function of the first stitch line 400 may, for example, be to help absorb or dampen the forces exerted on the tear stitching 201a during initial deployment of the air bag 14. The first stitch line 400 may thus be configured to rupture in response to tension forces less than those in response to which the second stitch line 420 is configured to rupture. The first stitch line 400 may rupture, either partially or completely, under forces exerted on the tear stitching 201a during initial deployment of the air bag 14, leaving the second stitch line 420 intact so that it can respond in the desired manner to the aforementioned vehicle 12 and occupant 20 conditions in the vehicle. For example, the second stitch line 420 can remain intact during initial deployment only to subsequently rupture to release the slackened portion 140 and allow the first segment 118 to fully tension and actuate the vent 80. Alternatively, the second stitch line 420 can remain intact throughout inflation of the air bag 14 such that the vent 80 is non-actuated.

From the above, those skilled in the art will appreciate that a predictable, reliable, and repeatable rupture of the first and second stitch lines 400 and 420 can be achieved by selecting a stitch thread with an appropriate tensile strength and using it in an appropriate configuration. For example, through testing, the magnitude of the tension exerted on the portions of material 220 and 230 due to deployment of the air bag 14 and the tension exerted due to fully inflated conditions can be determined. The shape/configuration and material construction of the first stitch line 400 could be selected so that its rupture strength is at or about the magnitude of the measured deployment tensions. The shape/configuration and material construction of the second stitch line 420 could be selected so that its rupture strength is at or about the magnitude of the tensions measured during the fully inflated conditions.

Figure 10:
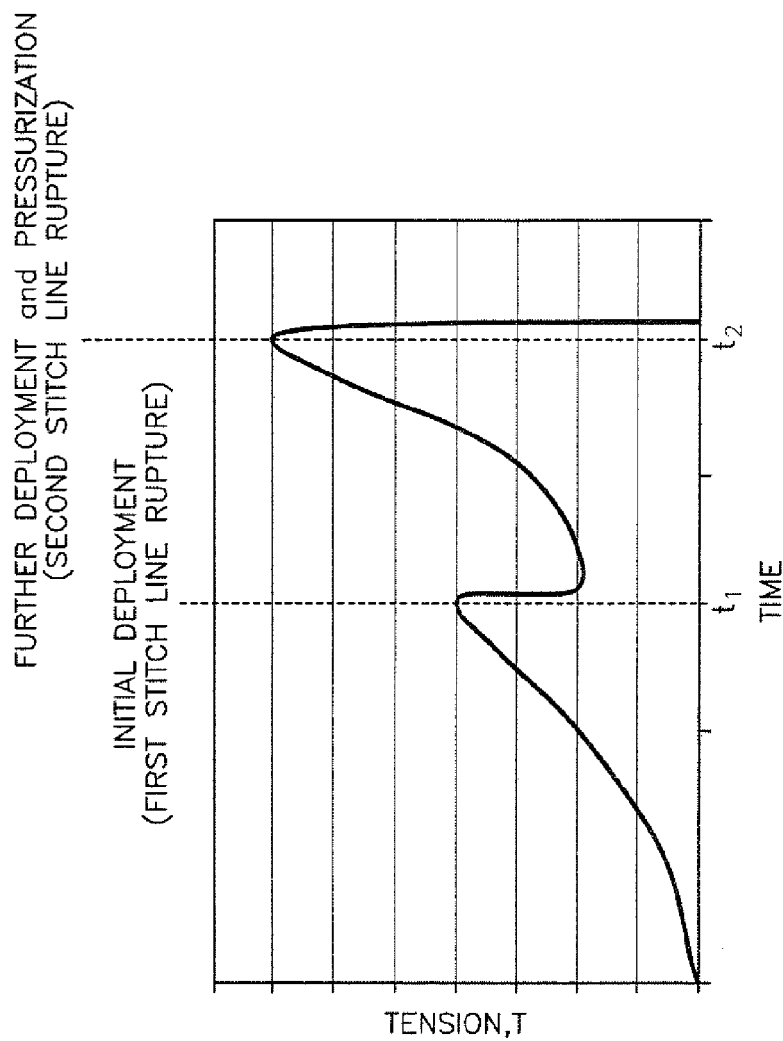
FIG. 10 is a chart illustrating properties of the tear stitching of FIG. 9.

FIG. 10 is a chart that illustrates the function of the tear stitching 201a of the embodiment of FIG. 9. As shown in FIG. 10, as the air bag 14 deploys, the tension applied to the first and second portions of material 220 and 230 begins to increase. At time $t_1$, initial air bag 14 deployment increases the tension on the portions of material 220, 230 to a magnitude at which the first stitch line 400 ruptures. This causes a brief decrease in the tension due to the force absorbing/damping provided by the first stitch line 400. As the event prompting deployment of the air bag 14 continues, vehicle 12 and occupant 20 conditions, such as a normally seated and unbelted occupant, allow continued air bag deployment, which increases the tension on the portions of material 220, 230 to the point at which the second stitch line 420 ruptures at time $t_2$. This completes rupture of the tear stitching 201a and releases the interconnection between the portions of material 220 and 230.

Those skilled in the art will appreciate that the embodiment of the invention illustrated in FIGS. 9 and 10 allows for a wide variety of configurations of the tear stitching 201a. For example, more than two stitch lines could be used to tailor further the performance characteristics of the tear stitching 201a. As another example, the first and second stitch lines 400 and 420 may constitute portions of a single stitch line instead of separate stitch lines.

FIGS. 11-13B illustrate an air bag 14 in accordance with another aspect of the present invention. In this embodiment, the guide member 130 is omitted and the tether 112 includes additional structure that cooperates with the guide member 200 for helping to ensure the vent 80 does not prematurely actuate during initial inflation of the air bag 14. It will be appreciated that the guide member 200 may be used in combination with the first guide member 130 of FIGS. 1-5B (not shown).

Figure 11:
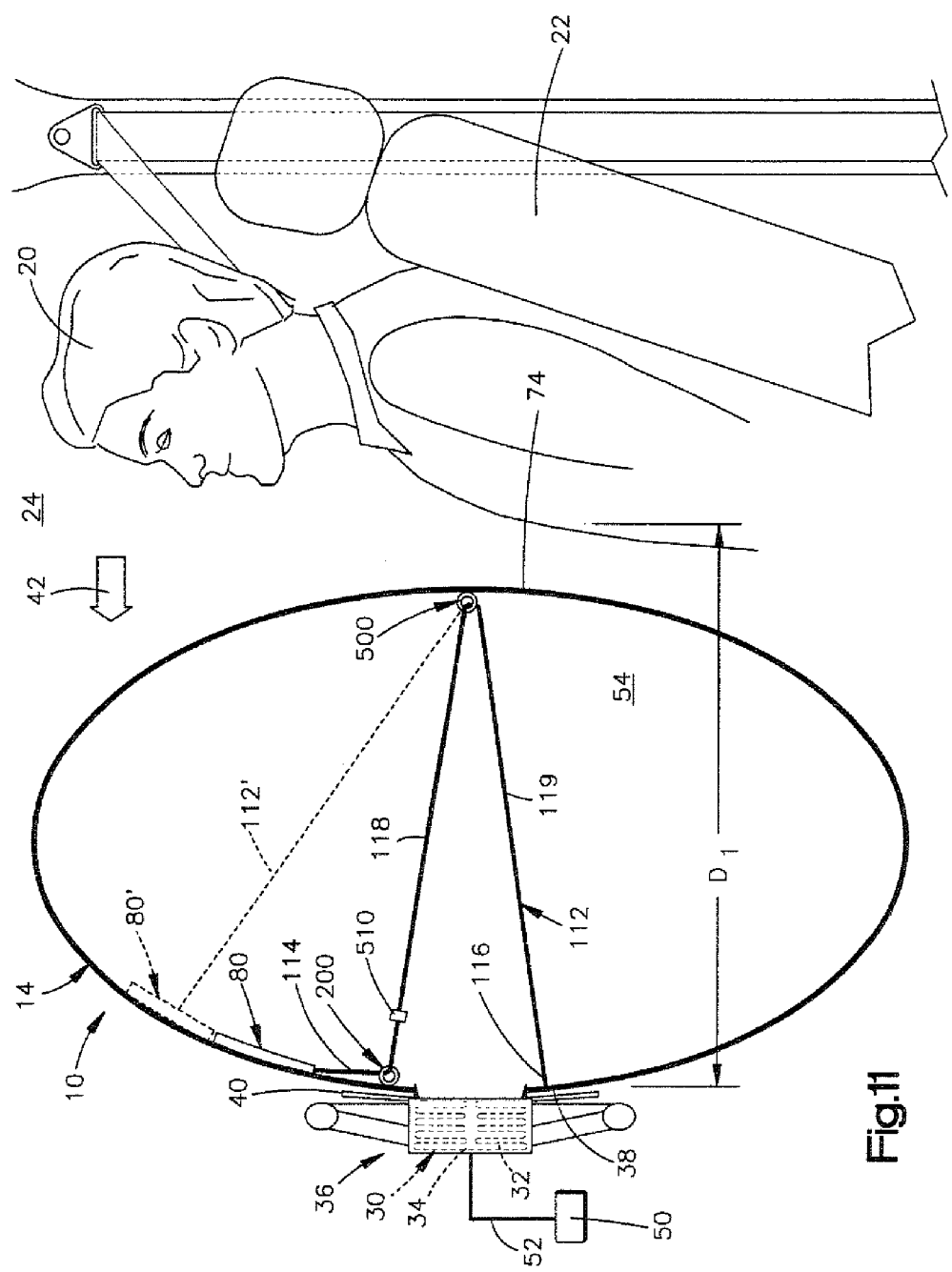
FIG. 11 is a schematic side view illustrating an apparatus for helping to protect an occupant of a vehicle in a first condition according to a second embodiment of the present invention.
Figure 12:
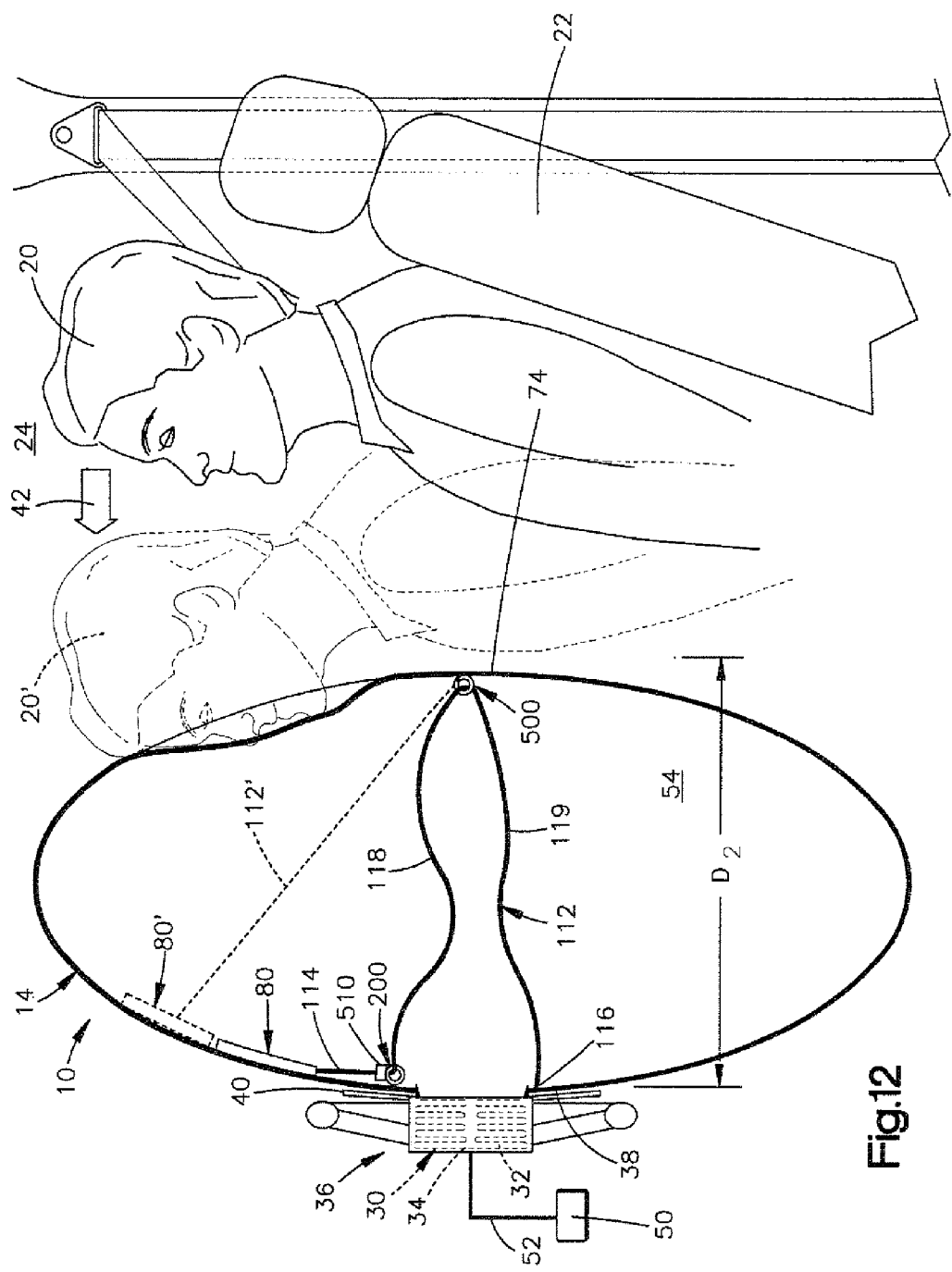
FIG. 12 is a schematic illustration of the apparatus of FIG. 11 in a second condition.

Referring to FIGS. 11 and 12, the tether 112 extends through a guide member 500 secured to the front panel 74 of the air bag 14 in a known manner. The guide member 500 has a round or ring shape and is formed of air bag 14 material, e.g., fabric. The guide member 500 is sized to allow the tether 112 to slide therethrough. The guide member 500 replaces the tear stitched guide member 130 of FIGS. 1-5B.

Figure 13A:
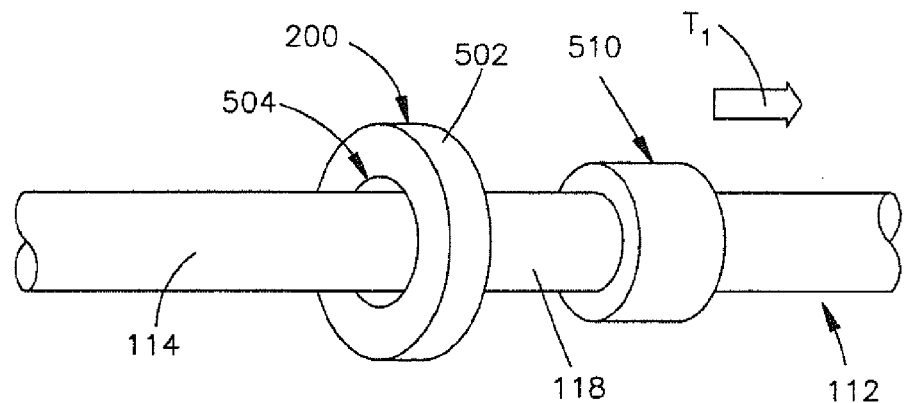
FIGS. 13A and 13B are enlarged schematic illustrations of different conditions of a second guide member of the apparatus of the present invention.
Figure 13B:
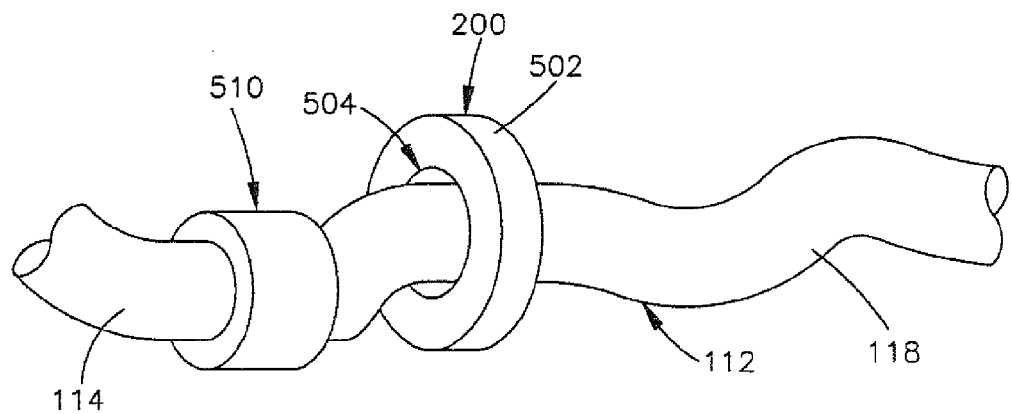

FIGS. 13A and 13B illustrate the guide member 200 in more detail. In particular, the guide member 200 constitutes a body 502 secured to the air bag 14 (not shown) in a known manner at a location adjacent the steering wheel 36. The body 502 has a round or ring shape and is formed of air bag 14 material, e.g., fabric. An aperture 504 extends through the body 502 and is sized and shaped to allow the tether 112 to slide through the aperture. The aperture 504 may therefore have a circular or polygonal shape.

A stop 510 secured to or formed integrally with the first end 114 of the tether 112 cooperates with the guide member 200 for controlling the degree of tension on the tether between the body 502 and the vent 80. The stop 510 extends radially outward from the tether 112 and is formed of a resilient material that elastically deforms under compression. The stop 510 is sized to be larger in cross-section than the aperture 504 but is deformable under compression to pass through the aperture when a predetermined amount of tension is applied to the first end 114 of the tether 112.

Referring to FIGS. 12 and 13B, the stop 510 is positioned near or on the first end 114 of the tether 112 initially between the body 502 and the vent 80 such that the tether is slackened between the body and the vent prior to air bag 14 deployment. During initial air bag 14 deployment the first end 114 of the tether 112 remains slackened and, thus, the stop 510 remains between the body 502 and the vent 80. Due to friction between the tether 112 and the guide member 500 on the front panel 74 during initial air bag 14 deployment, the stop 510 may move with the tether away from the vent 80 and into engagement with the body 502. The stop 510, however, is larger than the aperture 504 and therefore is initially prevented from passing through the aperture. More specifically, the stop 510 is configured such that it will not sufficiently deform to pass through the aperture 504 unless tension $T_1$ on the tether 112 reaches a predetermined level that corresponds with a predetermined degree of air bag 14 deployment. Due to this configuration, the first end 114 of the tether 112 does not and cannot tension when the stop 510 is located between the body 502 and the vent 80. Consequently, the first end 114 of the tether 112 does not and cannot actuate the vent until the air bag 14 sufficiently deploys.

Referring to FIGS. 11 and 13A, the expanding air bag continues to increase the tension $T_1$ on the tether 112 until the tension reaches the predetermined level necessary to pull the stop 510 though the aperture 504. In particular, when the tension $T_1$ reaches this predetermined level the stop 510 is compressed against the body 502 sufficient to pass through the aperture 504. Once this occurs, the first segment 118 is free to tension with the expanding air bag 14 until the first end 114 of the tether 112 actuates the vent 80.

The guide member 200 of the present invention helps ensure the vent 80 reaches its desired position on the air bag 14 during deployment prior to being actuated. As noted, the first end 114 of the tether 112 must be tensioned to actuate the vent 80. The stop 510 of the guide member 200, however, does not pass through the aperture 504 to allow the first end 114 of the tether 112 to tension until or unless the front panel 74 reaches the predetermined distance from the steering wheel 36 and, thus, the tether remains slackened between the vent 80 and the guide member 200. Consequently, the vent 80 of the present invention cannot be actuated until or unless the stop 510 passes through the aperture 504, thereby giving the vent sufficient time to reach the desired position on the air bag 14.

From the above description of the invention, those skilled in the art will perceive improvements, changes and modifications. Such improvements, changes and modifications within the skill of the art are intended to be covered by the appended claims. For example, it will be appreciated that one or more of the components of each embodiment may be readily incorporated into each of the other embodiments within the spirit of the invention.

Having described the invention, the following is claimed:

1. An apparatus for helping to protect an occupant of a vehicle, the apparatus comprising:
   an inflatable vehicle occupant protection device configured to inflate between a vehicle surface and the vehicle occupant, the protection device comprising a front panel having a portion configured to be presented toward the occupant when the protection device is in an inflated condition;
   a vent having at least one opening for releasing inflation fluid from the protection device and having an actuated condition and a non-actuated condition;
   a tether having a first end connected to the vent for actuating the vent and a second end connected to the protection device; and
   a guide member connected to the front panel for slidably receiving a portion of the tether between the first and second ends, first and second portions of the guide member being releasably connected together to define a slackened portion, the first and second portions remaining connected together in response to initial deployment of the protection device below a predetermined degree to prevent the tether from tensioning such that the vent is in the non-actuated condition, further deployment of the protection device to the predetermined degree releasing the connection between the first and second portions to allow the tether to tension and act on the vent to place the vent in the actuated condition based on a position of the occupant in the vehicle.

2. The apparatus recited in claim 1, wherein the first and second portions of the guide member are connected together with tear stitching.

3. The apparatus recited in claim 2, wherein the tear stitching interconnects the first and second portions of the guide member that when interconnected maintain the protection device in a first inflated condition with a first inflated volume, the tear stitching being rupturable to release the interconnected first and second portions which allows the protection device to inflate to a second inflated condition with a second inflated volume, the second inflated volume being greater than the first inflated volume.

4. The apparatus recited in claim 2, wherein the tear stitching interconnects the first and second portions of the guide member in an overlying manner, the tear stitching being rupturable upon the protection device deploying to the predetermined degree to permit the interconnected first and second portions to move relative to each other, the tear stitching comprising a break point and first and second stitch segments extending away from the break point, the break point being positioned adjacent the front panel to focus tension forces acting to rupture the tear stitching on the break point so that the tear stitching ruptures first at the break point and then along the first and second stitch segments.

5. The apparatus recited in claim 2, wherein the tear stitching comprises first and second stitch lines positioned next to each other, the first stitch line being adapted to rupture in response to initial deployment of the protection device before the predetermined degree, the second stitch line being adapted to maintain the protection device at the initial stage of deployment prior to the protection device reaching the predetermined degree of deployment.

6. The apparatus recited in claim 5, wherein the second stitch line is adapted to rupture in response to unrestricted deployment and pressurization of the protection device.

7. The apparatus recited in claim 5, wherein each of the first and second stitch lines comprises a break point and first and second stitch segments extending away from the break point, the first stitch line having a configuration that is different than the second stitch line so that the rupture strength of the first stitch line is less than the rupture strength of the second stitch line.

8. The apparatus recited in claim 5, wherein the first stitch line has a V-shaped configuration and the second stitch line has an arcuate configuration.

9. The apparatus recited in claim 5, wherein the first stitch line has a first arcuate configuration and the second stitch line has a second arcuate configuration.

10. The apparatus recited in claim 5, wherein the first and second stitch lines comprise portions of a single line of stitching.

11. The apparatus recited in claim 2, wherein the tear stitching comprises a stitch thread and a bobbin thread, the bobbin thread having a tensile strength higher than a tensile strength of the stitch thread.

12. The apparatus recited in claim 2, wherein the tear stitching comprises a break point and first and second stitch segments extending away from the break point, the tear stitching being arranged on the guide member such that tension forces acting to rupture the tear stitching act primarily on the break point so that the tear stitching ruptures first at the break point and then along the first and second stitch segments.

13. The apparatus recited in claim 12, wherein the shape of the tear stitching affects the strength of the break point.

14. The apparatus recited in claim 12, wherein the tear stitching has an axis extending through the break point and bisecting the tear stitching, the tear stitching being arranged such that the axis extends substantially perpendicular to the tension forces acting to rupture the tear stitching.

15. The apparatus recited in claim 12, wherein the break point of the tear stitching comprises two or fewer stitches.

16. The apparatus recited in claim 1 further comprising a second guide member connected to the protection device through which the first end of the tether extends for actuating the vent, the tether being slidable relative to the second guide member.

17. The apparatus recited in claim 16, wherein the second guide member is connected to a rear panel of the protection device facing the front panel.

18. The apparatus recited in claim 16 wherein the second guide member comprises a loop of fabric having an aperture through which the tether extends.

19. The apparatus recited in claim 1, wherein a pair of openings in the guide member extends through the slackened portion for slidably receiving the tether.

20. The apparatus recited in claim 1, wherein the actuated condition of the vent is a closed condition blocking inflation fluid from venting from the protection device and the non-actuated condition of the vent is an open condition venting inflation fluid from the protection device.

21. The apparatus recited in claim 20, wherein the vent is configured to be placed in the closed condition in response to rupturing of the tear stitching to allow the protection device to reach a fully deployed condition.

22. The apparatus recited in claim 21, wherein a second guide member is connected to a rear panel of the protection device facing the front panel.

23. The apparatus recited in claim 22, wherein the second guide member comprises a loop of fabric having an aperture through which the tether extends.

24. The apparatus recited in claim 1, wherein the guide member retains a slackened portion of the front panel of the protection device during initial deployment of the protection device below the predetermined degree, further deployment of the protection device to the predetermined degree releasing the slackened portion of the guide member, which releases the slackened portion of the front panel to allow the tether to tension and act on the vent to place the vent in the actuated condition.

25. An apparatus for helping to protect an occupant of a vehicle, the apparatus comprising:
  an inflatable vehicle occupant protection device configured to inflate between a vehicle surface and the vehicle occupant, the protection device comprising a front panel having a portion configured to be presented toward the occupant when the protection device is in an inflated condition;
  a vent having at least one opening for releasing inflation fluid from the protection device and having an actuated condition and a non-actuated condition;
  a tether having a first end connected to the vent for actuating the vent and a second end connected to the protection device, a resilient stop being provided on the first end of the tether for providing slack in the first end of the tether;
  a first guide member connected to the front panel, a portion of the tether between the first and second ends extending through the first guide member; and
  a second guide member connected to the protection device through which the first end of the tether extends for actuating the vent, the tether being slidable relative to the second guide member, the stop being positioned between the vent and the second guide member and being prevented from passing through an aperture in the second guide member in response to initial deployment of the protection device below a predetermined degree to prevent the tether from tensioning such that the vent is in the non-actuated condition, further deployment of the protection device to the predetermined degree causing the stop to pass through the second guide member to allow the tether to tension and act on the vent to place the vent in the actuated condition based on a position of the occupant in the vehicle.

26. The apparatus recited in claim 25, wherein deployment of the protection device to the predetermined degree compresses the stop such that the stop passes through the aperture to allow the first end of the tether to tension and act on the vent to place the vent in the actuated condition.

27. The apparatus recited in claim 25, wherein the stop provides slack in the first end of the tether when the protection device deploys less than the predetermined degree, deployment of the protection device to the predetermined degree causing the stop to pass through the second guide member to allow the first end of the tether to tension and act on the vent to place the vent in the actuated condition.

28. The apparatus recited in claim 27, wherein the stop is formed of a resilient material and is prevented from passing through an aperture in the second guide member when the protection device deploys less than the predetermined degree, deployment of the protection device to the predetermined degree compressing the stop to allow the stop to pass through the aperture, which allows the first end of the tether to tension and act on the vent to place the vent in the actuated condition.

* * * * *